United States Patent
Chen et al.

(10) Patent No.: US 7,786,930 B2
(45) Date of Patent: Aug. 31, 2010

(54) GLOBAL POSITIONING SYSTEM LOG WITH LOW POWER CONSUMPTION

(75) Inventors: Tain-Rein Chen, Taipei (TW); Yueh-Yao Nain, Hsinchu (TW)

(73) Assignee: Avid Electronics Corp. (TW)

( * ) Notice: Subject to any disclaimer, the term of this patent is extended or adjusted under 35 U.S.C. 154(b) by 223 days.

(21) Appl. No.: 12/196,024

(22) Filed: Aug. 21, 2008

(65) Prior Publication Data
US 2010/0045524 A1   Feb. 25, 2010

(51) Int. Cl.
*G01S 1/00* (2006.01)
(52) U.S. Cl. .............................. 342/357.06; 342/357.74
(58) Field of Classification Search ............ 342/357.06, 342/357.74
See application file for complete search history.

(56) References Cited
U.S. PATENT DOCUMENTS

2008/0094499 A1* 4/2008 Ueno et al. ................. 348/372
2009/0040041 A1* 2/2009 Janetis et al. .......... 340/539.13

* cited by examiner

*Primary Examiner*—Thomas H Tarcza
*Assistant Examiner*—Harry Liu
(74) *Attorney, Agent, or Firm*—Hershkovitz & Associates, LLC; Abraham Hershkovitz

(57) ABSTRACT

A global positioning system (GPS) log with low power consumption has an antenna, a GPS module, a power control module, a main control module, a power adjusting unit and a memory. The main control module is connected to the GPS module and the power control module to retrieve the computing results of the GPS module and controls the power control module to periodically provide power to the GPS module according to a predetermined and variable power providing period. The power adjusting unit is connected to the main control module, analyzes the computing results of the GPS module and assists the main control module to adjust the power providing period. Since the main control module automatically adjusts the power providing period, the GPS log does not deplete unnecessary power on the GPS module. Therefore, the power consumption of the GPS log is reduced and the GPS operates longer.

14 Claims, 1 Drawing Sheet

GLOBAL POSITIONING SYSTEM LOG WITH LOW POWER CONSUMPTION

BACKGROUND OF THE INVENTION

1. Field of the Invention

The present invention relates to a global positioning system (GPS) log, and more particularly to a GPS log with a power adjusting unit that reduces unnecessary power consumption of the GPS log.

2. Description of Related Art

Conventional global positioning system (GPS) devices are in common use today. A conventional GPS device receives signals transmitted by satellites and computes the transmission time of the signals to determine positions and speed of the GPS device and intensity of the signals transmitted from the satellites.

Conventional GPS logs are electronic products relative to the GPS device. A conventional GPS log comprises an antenna, a GPS module, a memory, a power control module and a main control module. The antenna receives signals transmitted by satellites. The GPS module is connected to the antenna to receive the signals, computes speed and positions of the GPS log and further has a real time clock (RTC) that counts time and date accurately. The power control module is connected between a power source and the GPS module. The main control module is connected to the GPS module and the power control module. The main control module commands the power control module to provide power to the GPS module in a fixed period about 0.5 seconds so the GPS module computes the speed and the positions of the GPS log every 0.5 seconds. The memory is connected to the main module and stores the positions of the GPS log and the time and date until the GPS log is turned off. Therefore, the conventional GPS logs are capable of allowing users to read moving tracks of the GPS log from the positions of the GPS device or download data of the moving tracks of the GPS log to an external computer.

However, the GPS module has great power consumption because of the RTC. Even the GPS module cannot receive signals from the satellites or the GPS log is not moving, the GPS module still operates every 0.5 seconds and stores useless data in the memory. Accordingly, the conventional GPS log has a great unnecessary power consumption.

To overcome the shortcomings, the present invention provides a GPS log with low power consumption to mitigate or obviate the aforementioned problems.

SUMMARY OF THE INVENTION

The main objective of the invention is to provide a global positioning system (GPS) log with low power consumption.

The GPS log in accordance with the present invention comprises an antenna, a GPS module, a power control module, a main control module, a power adjusting unit and memory. The main control module is connected to the GPS module and the power control module to retrieve the computing results of the GPS module and controls the power control module to periodically provide power to the GPS module according to a predetermined and variable power providing period. The power adjusting unit is connected to the main control module, analyzes the computing results of the GPS module and assists the main control module to adjust the power providing period. Since the main control module automatically adjusts the power providing period, the GPS module does not deplete unnecessary power. Therefore, the power consumption of the GPS log is reduced and the GPS log operates longer.

Other objectives, advantages and novel features of the invention will become more apparent from the following detailed description when taken in conjunction with the accompanying drawings.

DETAILED DESCRIPTION OF PREFERRED EMBODIMENT

Figure 1:
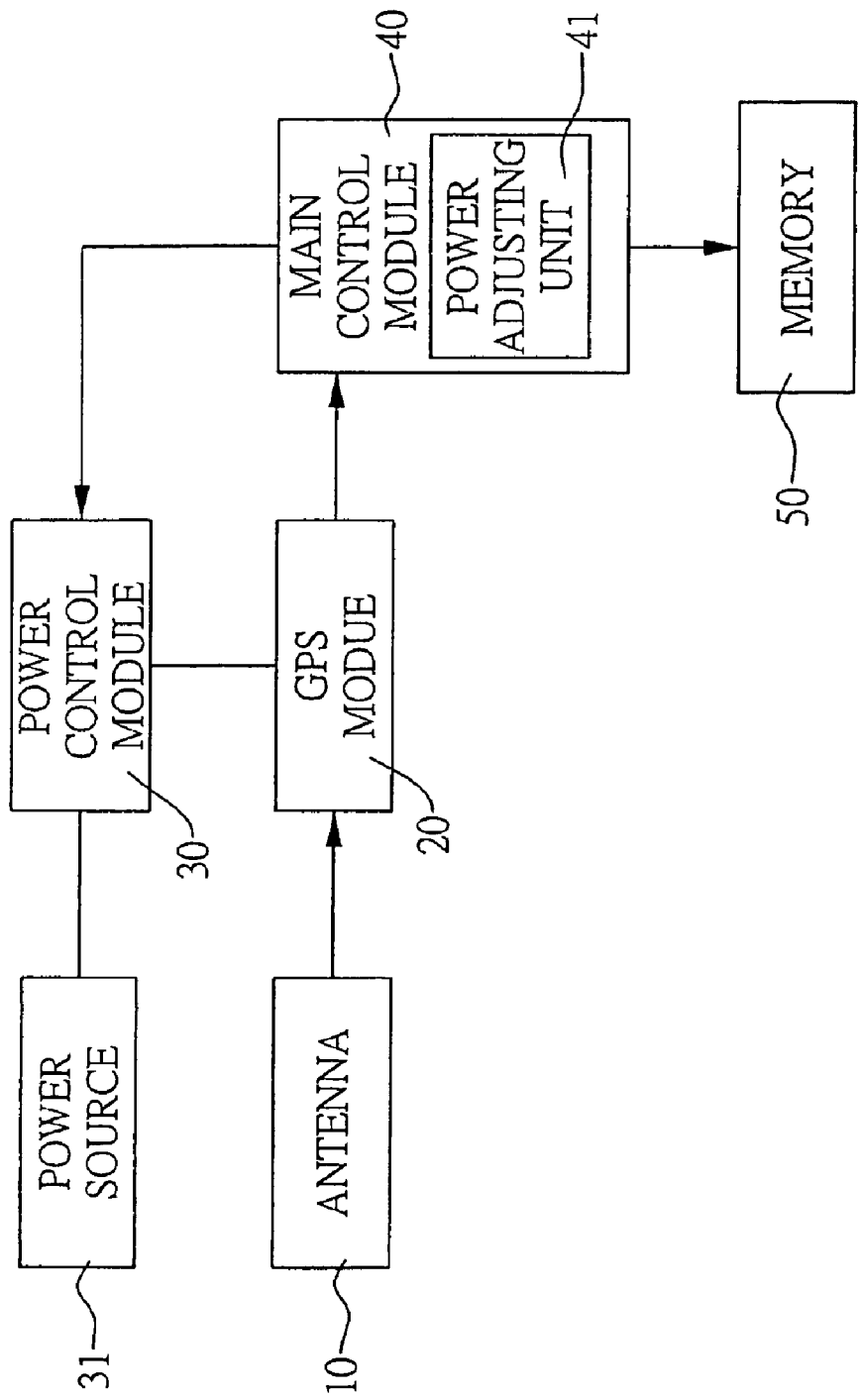
FIG. 1 is a functional block diagram of a global positioning system log in accordance with the present invention.

With reference to FIG. 1, a global positioning system (GPS) log in accordance with the present invention comprises an antenna (10), a GPS module (20), a power control module (30), a main control module (40), a power adjusting unit (41) and a memory (50).

The GPS module (20) is connected to the antenna (10) to receive signals from satellites, computes speed and positions of the GPS log and determines intensity of the signals according to the received satellite signals.

The power control module (30) is connected between a power source (31) and the GPS module (20) to provide power to the GPS module (20).

The main control module (40) is connected to the GPS module (20) and the power control module (30) to retrieve computing results of the GPS module (20), predetermines a variable power providing period and control the power control module (30) to periodically provide power to the GPS module (20) according to the present power providing period, such as providing power to the GPS module (20) every 0.5 seconds. Therefore, the GPS module (20) periodically receives the satellite signals, computes the speed and positions of the GPS log and determines intensity of the satellite signals.

The power adjusting unit (41) is connected to the main control module (40), analyzes the computing results of the GPS module (20) and assists the main control module (40) to determine whether the power providing period should be adjusted. For example, if the power adjusting unit (41) detects that the signals from the satellites are weak, the speed of the GPS log is zero or the position of the GPS log does change, the main control module (40) will increase the power providing period progressively to reduce the power consumption of the GPS module (20). Oppositely, the main control module (40) decreases the power providing period progressively until the adjusted power providing period is equal to the predetermined power providing period. Once the power providing period is adjusted, the GPS module (20) periodically receives the satellite signals, computes the speed and positions of the GPS log and determines intensity of the satellite signals according to the adjusted power providing period. In addition, the power adjusting unit (41) may be combined with the main control module (40) in an integrated circuit.

The memory (50) is connected to the main control module (40) to store the computing results of the GPS module (20).

Based on the foregoing description, the GPS log in accordance with the present invention adjusts the power providing period flexibly to reduce unnecessary power consumption, such as when the GPS module (20) receives satellite signals hardly or unnecessarily. Once the GPS log is in a tunnel or the GPS log is not moving, the GPS module (20) will receive weak signals from the satellites, the speed of the GPS log is zero or the position of the GPS log will not change. Accordingly, the main control module (40) increases the power providing period progressively to reduce the number of times for controlling the power control module (30) to provide power to the GPS module (20). Consequently, The GPS log in accordance with the present invention does not deplete unnecessary power on the GPS module (20) so the power consumption of the GPS log is reduced and the GPS log operates longer than the conventional GPS log.

Even though numerous characteristics and advantages of the present invention have been set forth in the foregoing description, together with details of the structure and function of the invention, the disclosure is illustrative only. Changes may be made in detail, especially in matters of arrangement of parts within the principles of the invention to the full extent indicated by the broad general meaning of the terms in which the appended claims are expressed.

What is claimed is:

1. A global positioning system (GPS) log with low power consumption comprising:
    an antenna;
    a GPS module connected to the antenna to receive signals from satellites, computing speed and positions of the GPS log and determining intensity of the signals;
    a power control module connected between a power source and the GPS module to provide power to the GPS module;
    a main control module connected to the GPS module and the power control module to retrieve the computing results of the GPS module, predetermining a variable power providing period and controlling the power control module to periodically provide power to the GPS module according to the present power providing period;
    a power adjusting unit connected to the main control module, analyzing the computing results of the GPS module and assisting the main control module to adjust the power providing period; and
    a memory connected to the main control module to store the computing results of the GPS module.

2. The GPS log as claimed in claim 1, wherein the main control module increases the power providing period progressively when the power adjusting unit detects that the speed of the GPS log is zero.

3. The GPS log as claimed in claim 1, wherein the main control module increases the power providing period progressively when the power adjusting unit detects that the position of the GPS log does change.

4. The GPS log as claimed in claim 1, wherein the main control module increases the power providing period progressively when the power adjusting unit detects that signals from the satellites are weak.

5. The GPS log as claimed in claim 2, wherein the main control module decreases the power providing period progressively until the power providing period is equal to the predetermined power providing period when the power adjusting unit detects that the speed of the GPS log is not zero.

6. The GPS log as claimed in claim 3, wherein the main control module decreases the power providing period progressively until the power providing period is equal to the predetermined power providing period when the power adjusting unit detects that the position of the GPS log changes again.

7. The GPS log as claimed in claim 4, wherein the main control module decreases the power providing period progressively t until the power providing period is equal to the predetermined power providing period when the power adjusting unit detects that signals from the satellites are not weak.

8. The GPS log as claimed in claim 1, wherein the power adjusting unit is combined with the main control module in an integrated circuit.

9. The GPS log as claimed in claim 2, wherein the power adjusting unit is combined with the main control module in an integrated circuit.

10. The GPS log as claimed in claim 3, wherein the power adjusting unit is combined with the main control module in an integrated circuit.

11. The GPS log as claimed in claim 4, wherein the power adjusting unit is combined with the main control module in an integrated circuit.

12. The GPS log as claimed in claim 5, wherein the power adjusting unit is combined with the main control module in an integrated circuit.

13. The GPS log as claimed in claim 6, wherein the power adjusting unit is combined with the main control module in an integrated circuit.

14. The GPS log as claimed in claim 7, wherein the power adjusting unit is combined with the main control module in an integrated circuit.

* * * * *